(12) United States Patent
Chopra et al.

(10) Patent No.: US 10,318,387 B1
(45) Date of Patent: Jun. 11, 2019

(54) AUTOMATED CHARGE BACKUP MODELLING

(71) Applicant: EMC IP Holding Company LLC, Hopkinton, MA (US)

(72) Inventors: Shelesh Chopra, Bangalore (IN); Chetan Battal, Bangalore (IN); Jafarullah Noordeen, Bangalore (IN); Sunil Amban Kandambeth, Bangalore (IN); Venkatraman Venkatasubramanyam, Chennai (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/650,785

(22) Filed: Jul. 14, 2017

(51) Int. Cl.
  *G06F 12/00* (2006.01)
  *G06F 11/14* (2006.01)
  *G06F 11/07* (2006.01)

(52) U.S. Cl.
  CPC ...... *G06F 11/1451* (2013.01); *G06F 11/0775* (2013.01); *G06F 11/1435* (2013.01); *G06F 11/1458* (2013.01); *G06F 11/1471* (2013.01)

(58) Field of Classification Search
CPC combination set(s) only.
See application file for complete search history.

(56) References Cited

U.S. PATENT DOCUMENTS

2002/0133737 A1*  9/2002  Novick ............... G06F 11/1464
                                                        714/4.4

* cited by examiner

Primary Examiner — Yong J Choe
(74) Attorney, Agent, or Firm — Staniford Tomita LLP

(57) ABSTRACT

Backup failures are categorized by storing a keywords file including a set of entries, where each entry includes at least one of a keyword or string pattern corresponding to a problem that may occur during a backup provided by a backup provider for a customer, and an indication of the problem as being one of chargeable or non-chargeable to the backup provider. A log file including messages logged during the backup is read. The messages in the log file are compared against the set of entries in the keywords file to identify any problems that may have occurred during the backup. Upon a particular problem being identified, a determination is made from the keywords file whether the particular problem is chargeable or non-chargeable to the backup provider. A results file is created listing the particular problem, and whether the particular problem is chargeable or non-chargeable to the backup provider.

15 Claims, 6 Drawing Sheets

AUTOMATED CHARGE BACKUP MODELLING

TECHNICAL FIELD

The present invention relates generally to the field of data management, and, more particularly, to categorizing backup failures.

BACKGROUND

Computing products and services generally do not operate in isolation. Rather, there can be many different components and interdependencies. For example, the successful functioning of a backup product or service often depends upon not just the backup product or service itself, but also the configuration of the environment in which the backup is deployed. Some of these configurations may be outside the control of the backup vendor.

If a backup fails, it would not be fair to blame the backup vendor if the cause of the failure is due to something that is the responsibility of the customer. Likewise, it would not be fair to blame the customer if the cause of the failure is due to something that is the responsibility of the backup vendor.

A large enterprise may conduct many hundreds and thousands of backups a day. If a particular backup should fail, it can be very difficult, time-consuming, and burdensome to trace the cause of the failure and assign responsibility.

There is a need for improved systems and techniques to efficiently categorize failures, such as backup failures, by identifying the party that is responsible.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Replicator, and Data Domain Boost are trademarks of Dell EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
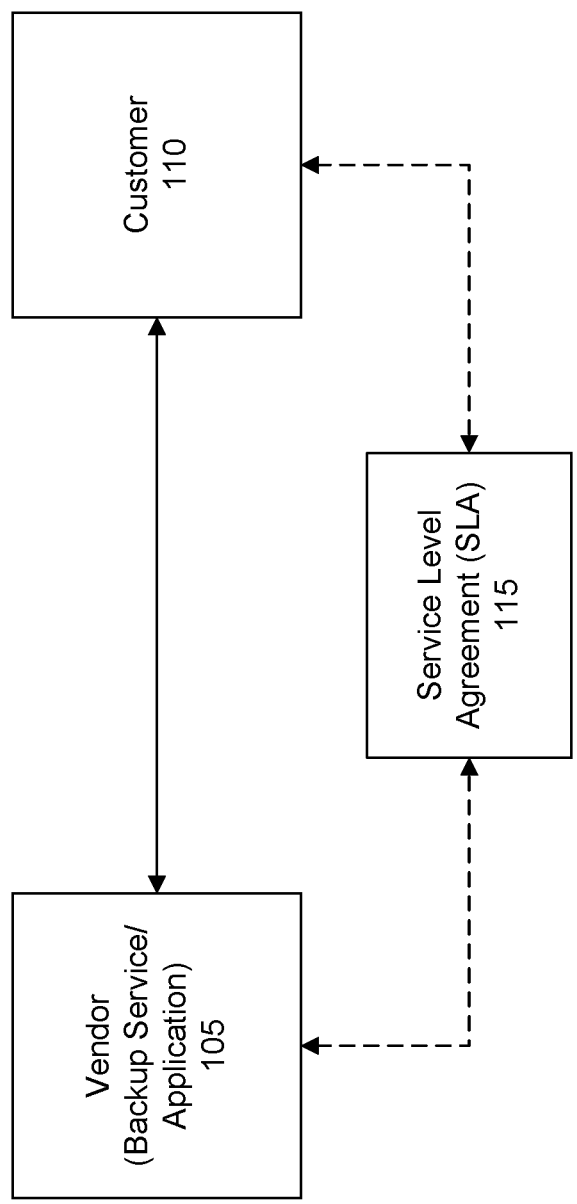
FIG. 1 is a simplified block diagram showing parties to a service level agreement (SLA).

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. A "non-transitory storage medium" or "non-transitory computer-readable storage medium" may include any media that can contain, store, or maintain programs, information, and data. Examples include physical media such as, for example, electronic, magnetic, optical, electromagnetic, or semiconductor media. More specific examples of non-transitory storage medium or non-transitory computer-readable storage medium include a magnetic computer diskette such as floppy diskettes or hard drives, magnetic tape, a random access memory (RAM), a read-only memory (ROM), an erasable programmable read-only memory (EPROM), a flash drive, a compact disc (CD), or a digital video disk (DVD).

Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for automatically identifying the party responsible for problems or other errors that may occur during a backup. Some embodiments of the invention involve handling error logs generated or associated with a backup and recovery application in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks), and other applications which generate error logs. Thus, aspects of the one or more embodiments described herein may be implemented on one or more computers executing software instructions, and the computers may be networked in a client-server arrangement or similar distributed computer network.

FIG. 1 shows a block diagram of a first party 105 (e.g., vendor) and a second party 110 (e.g., customer) in which the parties agree to a service level agreement (SLA) 115 that defines the level of performance that the vendor is to offer the customer. Specifically, the vendor may provide computing products, applications, services, and so forth that may be purchased by the customer. The SLA may define each party's responsibilities, expectations, performance standards and metrics, or penalties to be assessed when a performance metric is not met or a failure occurs.

One example of a service that may be provided is a backup. The backup may be provided by the vendor as a cloud-based service or as an application that may be installed on-premises at the customer site or data center. In this example, the SLA may define recovery point objectives (RPO) (i.e., the age of files that must be recoverable from backup storage for normal operations to resume if a computer, system, or network becomes unavailable as a result of a hardware, program, or communications failure), recovery time objectives (RTO) (i.e., duration of time and a service level within which a business process must be restored after a disaster in order to avoid unacceptable consequences associated with a break in continuity), backup service availability, backup windows, and so forth that the vendor may be responsible for meeting.

The customer may also have certain responsibilities that may be defined in the SLA. For example, depending upon the delivery method for the backup, the customer may be responsible for fulfilling various prerequisites such as ensuring that the backup client source computers have been properly configured with the requisite software, hardware, and network settings, remain available or powered on during a backup, that the backup targets are available, that the requisite network bandwidth is available, and so forth.

If, for example, a backup (or recovery) fails or otherwise falls below expectations, the vendor may be charged or assessed a monetary penalty depending upon the reason for the failure or type of problem that lead to the failure. For example, if there was a problem with the customer's environment (e.g., backup client was turned off), the vendor may not be charged. If, however, the problem was on the vendor's side (e.g., bug or defect in backup application), the vendor may be charged for the failure.

In a specific embodiment, systems and techniques are provided for automatically categorizing failures, problems, or issues that may occur during a backup or recovery as being chargeable or not chargeable to the vendor. The party that is responsible can be identified without having to engage in a tedious manual examination process.

A backup software product may perform multiple backups every day. In today's world, customers implement strict SLA's for backup reliability and availability. Customers may charge the software vendor for backup failures. These backup failures may be referred to as chargeable failures. Backup failures can be due to environmental issues at the customer location or due to software issues.

It is very tedious and time-consuming to separate failures among these two categories everyday on a manual basis either for the service provider or for the customer itself to charge back the vendors. The process can be very prone to errors hence leading to the wrong charge back and missing SLA. Some disadvantages of current approaches include lack of predictability can lead to sub optimal capacity utilization; manually calculating and separating out failures are error prone and time consuming; missed SLA metrics are wrongly diagnosed and tagged leading to wrong remediation as well as action planning; and indirectly or directly result in higher total cost of ownership (TCO) if failures are wrongly tagged as chargeable.

In an embodiment, systems and techniques are provided to reduce data unavailability (DU) and data loss (DL) in cases of disaster and provide cost savings to the business by zeroing in on the exact cause. Operational efforts and costs required to bifurcate errors related product and non-product are reduced. Improved business availability in terms of RPO and RTO is provided. Resolution time is lowered by through segregation of errors.

Figure 2:
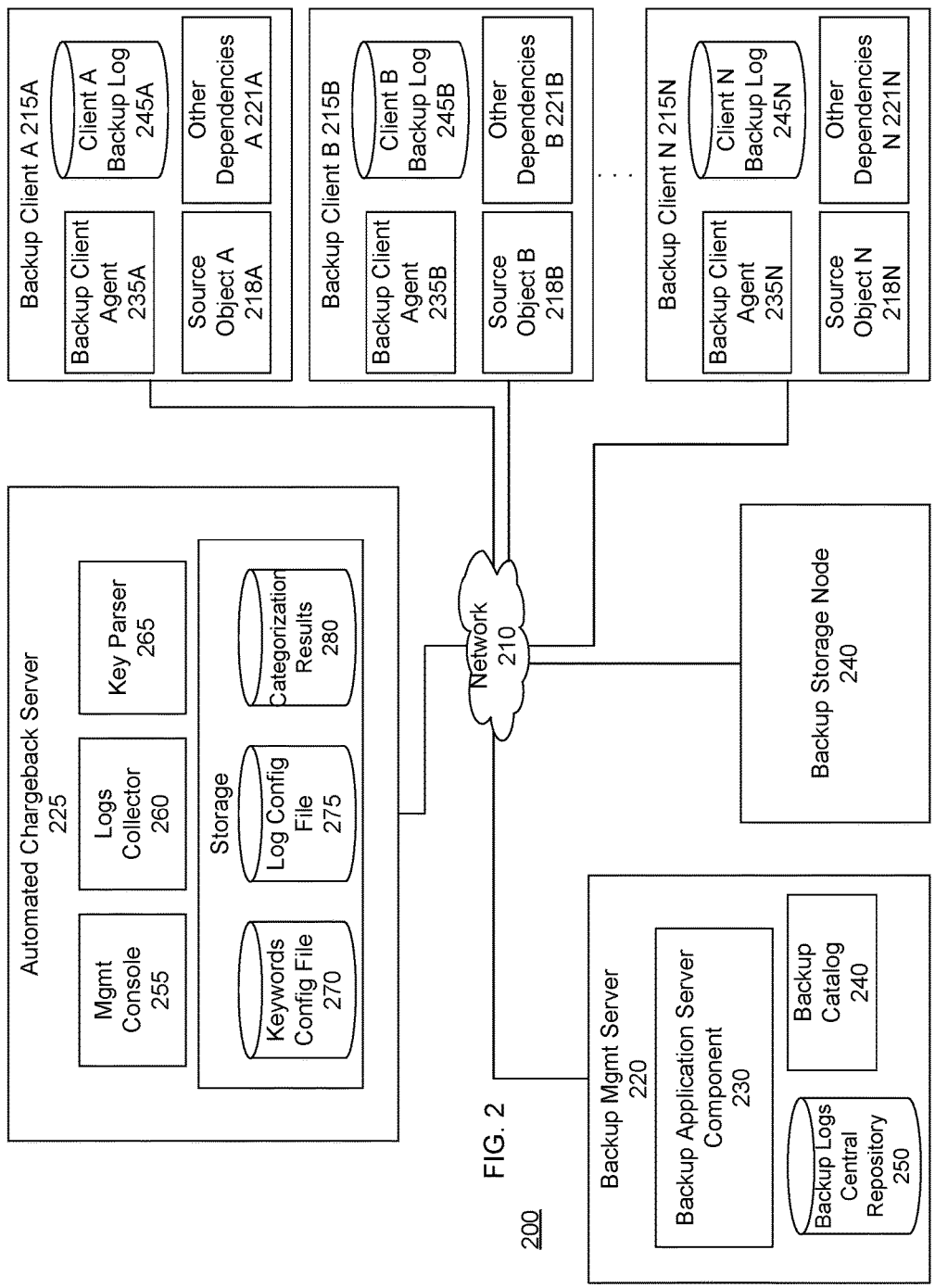
FIG. 2 is a diagram of a large-scale network implementing an automated chargeback system of categorizing backup failures, under some embodiments.

FIG. 2 illustrates a computer network system 200 that implements one or more embodiments of a system for categorizing failures in a backup system as being chargeable or not chargeable to a vendor of the backup system. In system 200, any number of various computing nodes are coupled directly or indirectly through a network 210. For example, there can be any number of clients or backup clients 215A-N and network server computers such as a backup management server 220 and automated chargeback server 225 that are coupled directly or indirectly to these clients through network 210. The network may be a cloud network, local area network (LAN), wide area network (WAN) or other appropriate network. Network 210 provides connectivity to the various systems, components, and resources of system 200, and may be implemented using protocols such as Transmission Control Protocol (TCP) and/or Internet Protocol (IP), well known in the relevant arts.

For the embodiment of FIG. 2, network system 200 includes a backup application that may include a server component 230 executing on the backup management server and client components or agents 235A-N executing on the backup clients. A backup client may further include a source object to be backed up. In the example shown in FIG. 2, first backup client A 215A includes a first source object A 218A, second backup client B 215B includes a second source object B 218B, and so forth. The source object may include a source application or other source data to be backed up such as a database, files, filesystem, volume, virtual machine, and so forth.

The backup application server and backup client components coordinate and communicate with each other to backup source objects from the clients to a backup storage node 240 and to recover the backed up object when needed. For example, the backup application client module, when instructed by the backup application server module, may backup client source data to the backup storage server.

Backups may be performed according to a pre-defined schedule or backup window (e.g., nightly backups), on-demand when requested by an administrator, or both.

The backup storage server includes backup target media such as disk, tape, a deduplication system, or combinations of these. The backup management server may maintain a backup catalog 240. The catalog provides an index of the data stored on or by the backup storage server. The backed up data may be stored as a logical entity referred to as a saveset. The catalog may include metadata associated with the backup (e.g., saveset) such as an identification of the file or files stored on the backup storage server (e.g., globally unique identifier (GUID) of a backed up database), filenames, saveset identifier, the time and date of backup (e.g., timestamp), size of the backup, path and location information of the source and destination target, and so forth. An administrator may browse the catalog to see detail on what has been backed up and select a particular data object, volume, and so forth to recover.

During a backup, log files may be generated by the backup application program, source that is being backed up by the backup application program, other application or service participating or assisting in the backup (e.g., virtualization platform or operating system), or combinations of these. For example, in some cases, the backup application program may coordinate with a source application or other application, service, or platform to perform a backup.

More particularly, depending upon the type of source object being backed up, the source object (or other application or service associated with the source), may participate or assist with the backup such as by quiescing a source application or otherwise pausing and bringing the source to a consistent state by flushing outstanding writes, generating a snapshot that the backup application may access to perform the backup, and the like. For example, when backing up a virtual machine hosted by the source client, a virtualization platform that manages the virtual machine may create a quiesced snapshot of the virtual machine for the backup application to rollover to backup storage.

Log files associated with the backup may record any number of brief messages regarding status, operations, events, errors, problems, or issues related to a backup. A log file provides an audit trail of the backup operation that can be useful in understanding the events that have occurred and diagnosing problems.

In some embodiments, one or more backup log files may be generated at each of the backup clients that are backed up. For example, there can be a first backup log A 245A generated at first backup client 215A and associated with a backup of the first backup client (e.g., backup of first source object A 218A). There can be a second backup log B 245B generated at second backup client 215B and associated with a backup of the second backup client 215B (e.g., backup of second source object B 218B). Instead or additionally, a set of backup logs 250 may be maintained in a central repository such as at the backup management server. For example, the backup clients may be configured to transmit their individual backup logs to the backup management server.

Computing products and services, such as a backup product, generally do not operate in isolation. The computing environment in which a backup is to be performed can be very complex as it may involve other dependencies such as various multi-tier applications with complex deployment configurations involving load balancers, web servers, application servers, database servers, large amounts of data, dependencies between servers in different tiers, application dependencies, coordination among different applications (e.g., coordination between the backup application and source application to be backed up, coordination between the backup application and virtualization platform managing a virtual machine to be backed up, or coordination between the backup application and a snapshot copy service), network dependencies, large numbers of different clients to backup, backup clients having different operating systems and versions, different libraries, different system hardware, and so forth. Thus, there may be other dependencies 221A (e.g., snapshot copy service, network settings, power state, or filesystem) at the first backup client. Other dependencies B 221B at the second backup client, and so forth.

Depending upon which particular component lead to a backup failure, the vendor or provider of the backup application or service may or may not be responsible. It can be very difficult and time-consuming to identify the responsible party because of the many different components and interdependencies that may be involved in a backup operation, the large number of backup clients, the amount of data to backup, and the frequency with which backups may occur.

In a specific embodiment, the automated chargeback server performs pattern matching or pattern recognition based on a predefined set of keywords related to backup failures for any backup software. In a specific embodiment, the system categorizes the backup failures so that a service provider can decide or review the chargeable and non-chargeable failures easily.

In a specific embodiment, a predefined set of keywords for different applications, operating systems, filesystems, virtualization management software, platforms, or virtualization platforms including, for example, Oracle, Microsoft SQL Server, Linux filesystems, and so forth are provided. Depending on the type of backup software or backup objects, additional sets of keywords can be added. The system can be used to manage categorization centrally for multiple backup servers.

In the example shown in FIG. 2, the automated chargeback server includes several modules and storage including a management console 255, logs collector 260, key parser 265, keywords configuration file 270, log configuration file 275, and categorization results 280. It should be appreciated that FIG. 2 is merely illustrative of an embodiment. The blocks can be functional rather than structural so that it is possible to have many different hardware configurations that can perform the illustrated functions. Implementation of the functional entities may vary. For example, in some cases the logs collector and key parser modules are combined into one code module. In other cases, the logs collector and key parser reside in separate code modules. One of ordinary skill in the art would recognize other variations, modifications, and alternatives.

In a specific embodiment, the keywords configuration file includes a set of predefined keywords, string patterns, or both describing or associated with any number of problems or errors that may occur during a backup, and includes an indication of each problem as being chargeable or non-chargeable to the backup provider. In a specific embodiment, one or more keywords in the file are formed as string patterns. A string pattern may include a string of characters, words, phrases, regular expressions, wildcard characters (e.g., "*"), symbols, or combinations of these.

In an embodiment, the keywords or string patterns correspond to error messages that may be generated by the applications or other computing products that may be involved in a backup. String patterns and regular expressions can be used to accommodate differences in the format of error messages that may be generated by the particular application, service, or computing product involved in a backup.

The keywords configuration file may include any number of keywords or string patterns. A first subset of string patterns may correspond to error messages generated by a first application (e.g., backup application). A second subset of string patterns may correspond to error messages generated by a second application (e.g., Oracle database application), different from the first application. A third subset of string patterns may correspond to error messages generated by a third application (e.g., Microsoft SQL), different from the first and second applications. A fourth subset of string patterns may correspond to error messages generated by a filesystem (e.g., Linux filesystem). A fifth subset of string patterns may correspond to customer environment configuration issues. And so forth. Combining the keywords or string patterns corresponding to the error messages that may be generated by each of the various applications into a single keywords configuration file can help to facilitate management and updates because all keywords or string patterns are located centrally.

In another specific embodiment, different sets of keywords configuration files are maintained for each of the different applications or computing products that may be involved in a backup. For example, a first keywords configuration file may include string patterns corresponding to error messages generated by a first application (e.g., backup application). A second keywords configuration file, separate from the first keywords configuration file, may include string patterns corresponding to error messages generated by a second application (e.g., Oracle database application). A third keywords configuration file, separate from the first and second keywords configuration file, may include string patterns corresponding to error messages generated by a third application (e.g., Microsoft SQL database application). A fourth keywords configuration file, separate from the first, second, and third keywords configuration file, may include string patterns corresponding to error messages generated by a filesystem (e.g., Linux filesystem). A fifth keywords configuration file, separate from the first, second, third, and fourth keywords configuration file may correspond to customer environment configuration issues. And so forth. Separating the keywords or string patterns corresponding to error messages that may be generated by each of the various applications into separate keywords configuration files can help to conserve and make efficient use of storage space. For example, if the filesystem involved in a backup of the client is not a Linux filesystem, the associated keywords configuration file for the Linux filesystem does not have to be provided.

Table A below shows an example of information that may be stored in a keywords file.

TABLE A

| Keywords/String Pattern | Chargeable? |
| --- | --- |
| Backup target device full | no |
| Backup of virtual machine metadata failed | yes |
| Maximum number of stream connections reached | yes |
| Too many snapshots already available | yes |
| . . . | . . . |

As shown in the example of table A above, the keywords file includes first and second columns. The first column lists keywords or a string pattern describing a type of problem that may occur during a backup (e.g., "Backup target device full," "Backup of virtual machine metadata failed," "Maximum number of stream connections reached," or "Too many snapshots already available"). The second column includes a tag, flag, or other indication of the problem description as being chargeable or not chargeable to the backup vendor. Thus, in an embodiment, an entry in the keywords configuration file may include at least one of a keyword or string pattern corresponding to or describing a problem that may potentially occur during a backup, and a flag indicating whether or not the problem is chargeable or not chargeable to the vendor.

In an embodiment, the system helps to facilitate deciding which party is to be assigned responsibility for a particular problem, error, or failure before the issue occurs. This helps to clarify the roles and responsibilities of each party beforehand (e.g., before a backup operation occurs). As a result, when an issue does in fact occur, much less time is spent debating responsibility, assigning blame, and manually reviewing logs. Further, if the parties do not adhere to a strict schedule to review the logs, over time the logs may be inadvertently deleted or overwritten, thus leading to more confusion, debate, and disagreement over which party should bear the responsibility for a failure. Because the system can be triggered to run automatically, the system can scan and categorize the log events as chargeable or not chargeable before the logs are automatically deleted or overwritten. The administrator user does not have to remember to save, export, or rename the log files for later review.

The management console provides an interface such as a graphical user interface (GUI), command line interface (CLI), or other through which a user (e.g., an administrator) can interface with the automated chargeback system. For example, the user can provide input to the system through the interface and view output from the system through the console. Using the management console, the user can view the keywords or string patterns stored in the keywords configuration file and make edits (e.g., change existing keywords or string patterns, add new keywords or string patterns, or delete keywords or string patterns), view backup failure categorization results, filter the results (e.g., show only chargeable failures or show only non-chargeable failures), sort the results, search the results, or edit the results (e.g., change a failure tagged as chargeable to non-chargeable or change a failure tagged as non-chargeable to chargeable).

In an embodiment, the log configuration file stores a listing of log filenames, and the directories or other folder path information indicating where the log files associated with a backup are located. The location of the log files may vary depending on factors such as the platform (e.g., Unix, Linux, Windows, or NetWare) on the backup client, particular backup application used to backup the client, type of application participating in the backup of the client, and other factors.

In a specific embodiment, the log file path entries stored in the log configuration file may be manually defined. For example, before or after a backup, an administrator may provide to the system (e.g., through the management console) the locations of the log files for the backup. The system receives the file path information and stores the information in the log configuration file. In another specific embodiment, the log file path entries may be added to the log configuration file dynamically. For example, in this specific embodiment, there can be an agent installed at a client that monitors a backup of the client. As log files are generated during the backup, the agent can record in a local log configuration file information regarding the generated log files such log filenames and the directories within which the log files are located, and then send individual local log configuration file to the automated chargeback server.

The logs collector is responsible collecting or gathering the log files associated with a backup for analysis. In a specific embodiment, the logs collector accesses the log configuration file to obtain the log filenames, directories, or folders where the log files are located. For example, after a backup of a first client has completed, the logs collector may read the log configuration file to discover the directories on the first client (or other location) at which the log files generated during the backup of the first client are stored. The logs collector may then obtain or fetch the log files from the discovered directories on the first client (or other location).

Likewise, after a backup of a second client has completed, the logs collector may read the log configuration file to discover the directories on the second client (or other location) at which the log files generated during the backup of the second client are stored. The logs collector may then obtain or fetch the log files from the discovered directories on the second client (or other location), and so forth. These log files may be transferred or copied to the automated chargeback server for analysis. Alternatively, the logs may be analyzed in situ at the location where they were originally generated.

In an embodiment, the logs collector may scan the various client computers and other devices connected to the network to discover, gather, and obtain the relevant log files. There can be preconfigured default locations (e.g., default folder paths) where a log file may be stored. If the collector is unable to find a log file at the default location, the collector may begin traversing the entire folder or directory tree of the client hosting the associated backup application component or service to find or locate the log file. The collector may access a list that identifies the various backup clients (e.g., Internet Protocol (IP) addresses of the clients) and default folder locations where log files may be stored. The logs collector may poll the backup clients to request the log files.

The key parser is responsible for reading the listing of keywords or pattern strings from the keywords configuration file, processing the log files, and identifying error messages recorded in the log files as being chargeable or non-chargeable to the backup vendor based on the corresponding, recognized, or matching problem descriptions in the keywords configuration file.

Consider, as an example, that the backup of a virtual machine failed with error message (EM1) in a log file named LOGFILE1: "Too many snapshots already available." In this example, the above message is not specific to a backup product, and this message may be thrown by the virtualization platform (e.g., VMware) application programming interface (API). In this example, "EM1" may act as a keyword here and may be updated in the keywords configuration file (e.g., "keywords.cfg"). LOGFILE1 may act as the log and may be updated in the log configuration file (e.g., "logs.cfg") or feed directly to the log list collector. The log list collector collects the log file and initiates the key parser utility which reads the list of keywords from keywords.cfg and processes the log files by matching the keywords either using the regular expression or elastic search depending on the amount of data. Upon processing, the key parser categorizes the failure. The categorized failure may be outputted for display in a user interface (UI) activity window, saved to an activity database, included in a report (e.g., hypertext markup language (HTML) report), or otherwise saved as categorization results 280.

Table B below shows an example database of categorization results.

TABLE B

| Backup Set ID | Timestamp | Keyword | Chargeable |
|---|---|---|---|
| 111 | Oct. 7, 2016, 2:00 AM | Backup of virtual machine metadata failed | Yes |
| 222 | Oct. 7, 2016, 2:05 AM | Cannot open backup target device for writing | No |
| 222 | Oct. 7, 2016, 2:11 AM | Maximum number of stream connections reached | Yes |

As shown in the example of table B above, there are first, second, third, and fourth columns. The first column stores the backup set identifier of a backup. The second column stores a date and time (e.g., timestamp) of the backup. The third column lists the matching keywords or string pattern from comparing the backup log and keywords configuration file. The fourth column includes a tag indicating whether or not the problem described is chargeable or not chargeable to the vendor. Further, the same backupset can have multiple failures which can be internally chargeable versus non-chargeable (see, e.g., backup saveset ID "222" from table B above).

The key parser may apply or leverage any competent search technique, algorithm, or search engine to compare messages logged in a log file against the keywords, string patterns, or potential problems described in the keywords configuration file to determine whether there is a match, best match among similar matches, or correspondence between a logged message and an entry in the keywords configuration file.

Once a match or other correspondence is found between a logged message and an entry to problem described in the keywords configuration file, the problem can be cross-referenced to identify the associated tag in the keywords configuration file indicating the party responsible for the problem. For example, consider that an entry in the keywords configuration file includes the string pattern "cannot open*." This string pattern includes a wild card character (e.g., "*") representing a variable string of unknown characters. A search engine may then process the log file to compare the logged messages against the string pattern "cannot open*" to determine whether there are any matches with the pattern.

In a specific embodiment, a message recorded in a backup log file thus becomes an input string to be compared against a listing of predefined string patterns in the keywords configuration file where each predefined string pattern corresponds to a problem that may potentially occur during a backup and includes a flag indicating the party responsible.

Figure 3:
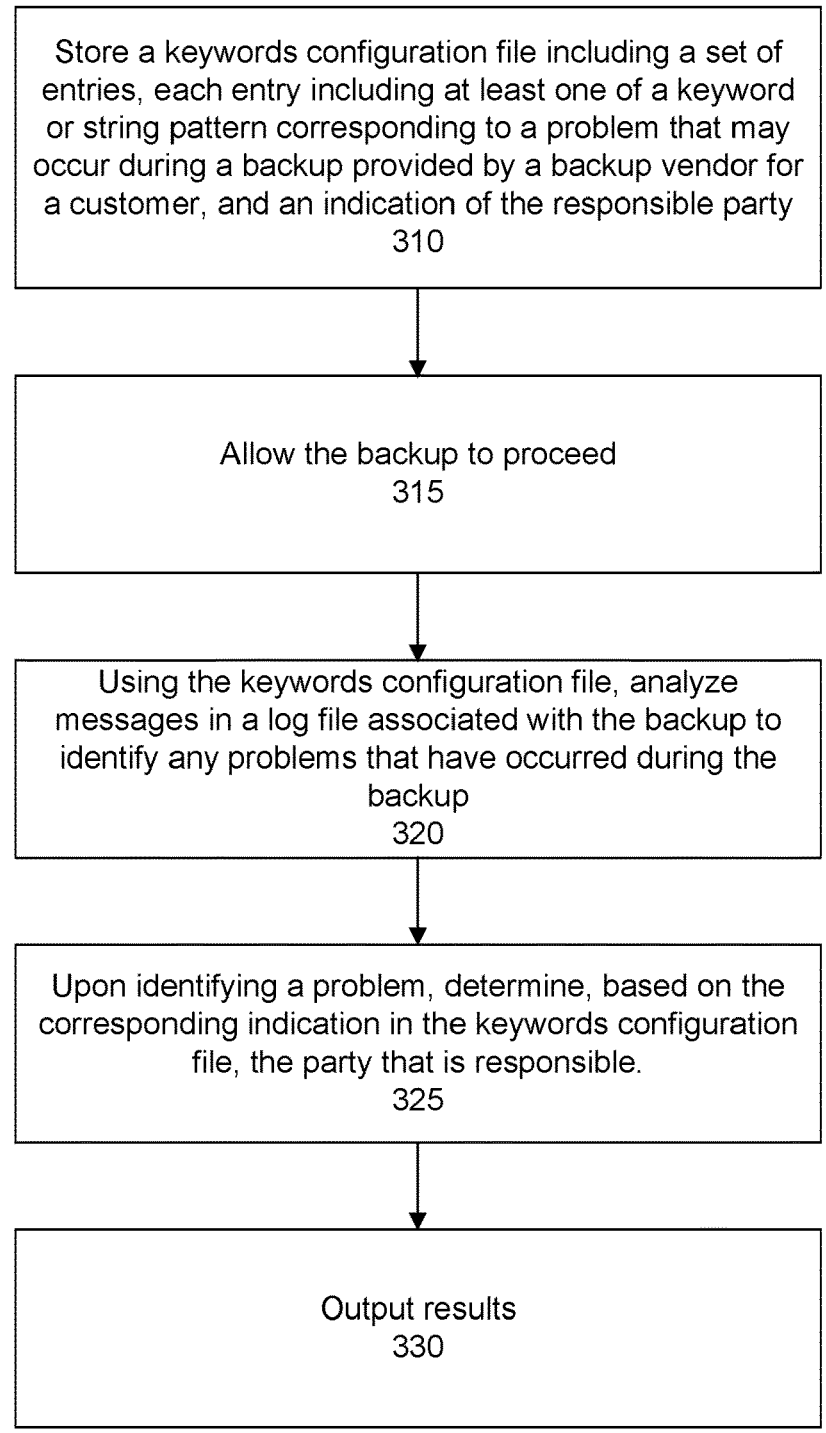
FIG. 3 shows a flow diagram for categorizing backup failures according to a specific embodiment.

FIG. 3 shows an overall flow for automatically categorizing backup failures. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 310, a keywords configuration file is stored. The keywords configuration file includes a set of entries. Each entry includes at least one of a keyword or string pattern corresponding to a problem that may occur during a backup provided by a backup vendor for a customer, and an indication of the party responsible for the problem should it occur. In a step 315, the backup is allowed to proceed.

In a step 320, after backup, messages in a log file associated with the backup are analyzed using the keywords configuration file to identify any problems that may have occurred during the backup. In a step 325, upon identifying a problem (e.g., logged message in log file matches an entry in the keywords configuration file), a determination is made as to the party responsible by examining or cross-referencing to the corresponding field in the entry that indicates whether the problem is or is not chargeable to the backup vendor.

In a step 330, the results are outputted. In a specific embodiment, the message from the log file corresponding to the problem may be copied to a separate results file (e.g., text file) along with an indication or tag of the party responsible. The results file may include a subset of messages from the log file, each message in the subset corresponding to a problem encountered during a backup and having been tagged with an indication of the party responsible. This filtering of the logged messages and tagging of responsible party helps to facilitate a review of the backup operation. Logged messages that are unrelated to backup problems or errors may be excluded or omitted from the results file. The results including the logged error messages and party responsible may be displayed within an activity window UI on an electronic screen for viewing by the administrator user. The results may be stored in a database. Depending upon what other applications, services, and so forth that are involved in the backup operation, the results file may include a compilation of messages generated by the different applications, different services, and so forth involved in the backup operation.

Figure 4:
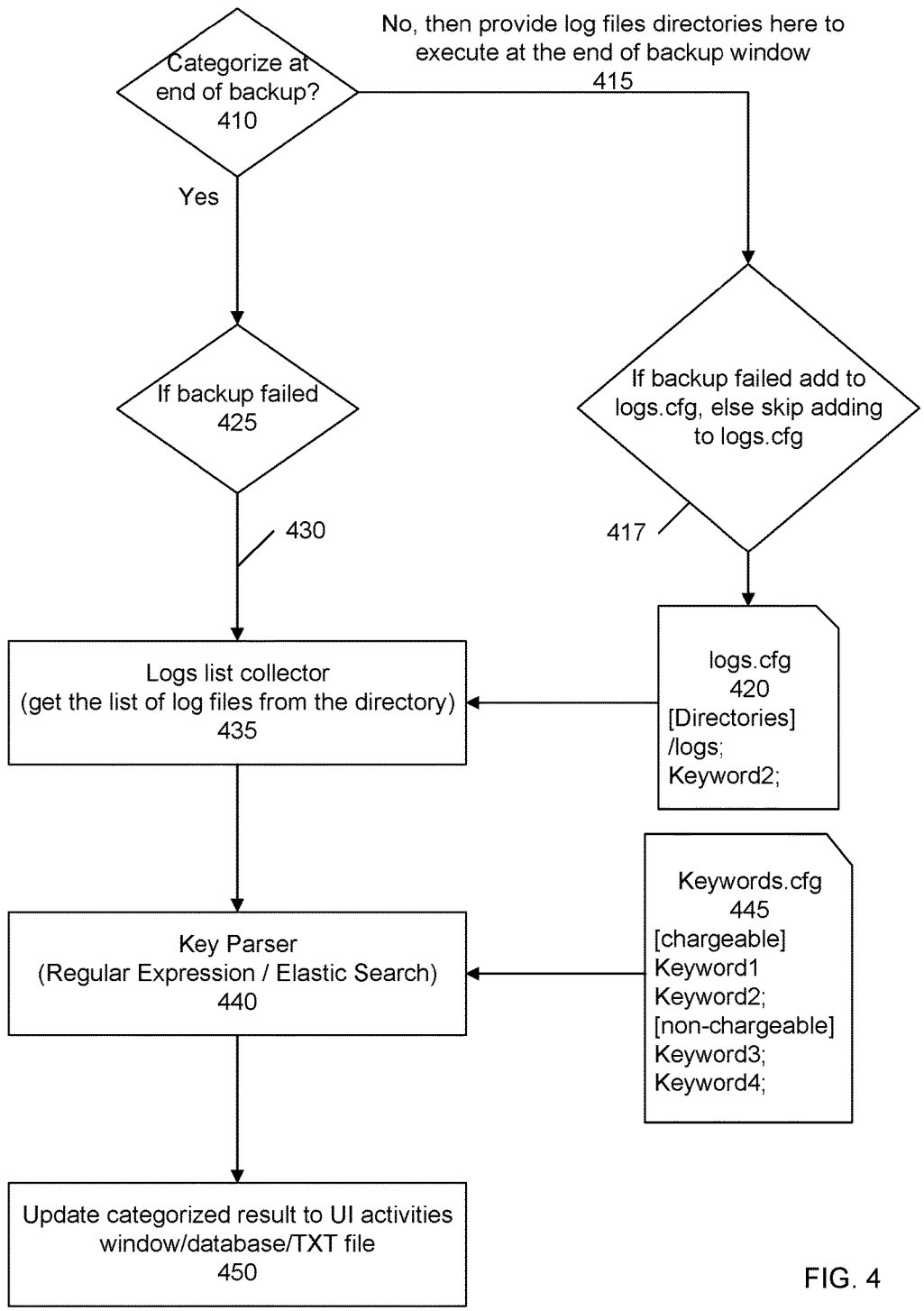
FIG. 4 shows another flow diagram for categorizing backup failures according to a specific embodiment.

FIG. 4 shows another program workflow for automatically categorizing backup failures. In a step 410, a configuration setting is stored indicating whether categorization should be performed at the end of each backup associated with a backup window or should be postponed until after all backups associated with the backup window have been completed.

For example, in an enterprise setting there may be tens, hundreds, or even thousands of client computers that are to be periodically backed up. Each of the clients may be part of a pre-scheduled backup window. For example, there can be a nightly backup window specifying that all backup jobs be completed within a 6 or 8 hour time period or other set duration. The categorization process consumes computing resources including processing cycles, memory, and so forth. Thus, in some cases, the administrator may wish to postpone or delay categorization until all backup jobs of a backup window have completed. This allows the computing resources to remain dedicated to processing the backup jobs so that the backups can be completed with the scheduled time window for backups. In an embodiment, a method of categorizing backup failures may include allowing a backup job of a first backup client to complete; and delaying categorization of a backup log associated with the backup job of the first backup client until after a backup job of a second backup client is complete.

In other cases, the administrator may wish to categorize immediately after a backup ends. For example, in the case of an on-demand backup or in the case where there are relatively few backup clients or a large of amount of compute resources are available, the administrator may configure an option to categorize immediately after a backup ends. The system provides the administrator with flexibility as to when categorization should be performed.

In a specific embodiment, parsing and categorization of backup logs is performed only for a failed backup. This helps to reduce loads because backup logs for successful backups will not be parsed and categorized. In particular, if categorization is not to be performed immediately after the end of each backup, a determination is made (step 417) as to whether a particular individual backup failed. The determination may be made by, for example, scanning a log generated by the backup application for the individual backup for any existence of a failed saveset. Instead or additionally, the backup application may be configured to record or identify logs associated with failed backups for the automated chargeback server to categorize. The backup application may be configured to generate an alert of a failed backup that may be received by the automated chargeback server. The alert may include an identification of the backup log associated with the failed backup and the automated chargeback server may then record the location of the backup log. The recording allows the automated chargeback server to later fetch, parse, and categorize the backup log associated with the failed backup.

In this specific embodiment, when the backup has failed the log file directories may be saved (step 415) to a logs configuration file 420 for processing at the end of a backup window. The logs configuration file may be separate from the backup logs generated by the backup application including other applications or services involved in the backup. When the backup has been successful, the associated log file directories are not added to the logs configuration file. In other words, instead of adding all the log files to the logs configuration file irrespective of whether a backup passed or failed, a log file is added to the logs configuration file only if the backup has failed. This reduces the load on the components including the log list collector and key parser in the subsequent stages. For example, the key parser will not be parsing successful backup logs. The key parser will be parsing only the failed backup logs.

Alternatively, if categorization is to be performed immediately after the end of a particular backup, a determination may also likewise be made (as discussed above) as to whether the backup failed (step 425). Upon determining the backup failed, the log file associated with the backup is passed 430 to the logs list collector. Likewise, if the option to categorize at the end of the backup window was selected (and the backup window has ended), a logs list collector gets, gathers, obtains, or receives the list of log files from the relevant directory (step 435) as indicated in the logs configuration file. In another specific embodiment, the parsing process may be applied to all backup logs. This option may be selected if the administrator desires further assurance and peace-of-mind that all backup logs, regardless of backup success or failure, have been parsed and, if necessary, a problem categorized as being chargeable or not chargeable to the backup vendor.

In a step 440, the key parser applies, calls, directs, performs, or conducts a search between the messages recorded in the log files and keywords configuration file 445. In a step 450, the system updates or outputs the categorized result to a user interface (UI) activity window, database, file (e.g., text file), or combinations of these.

Figure 5:
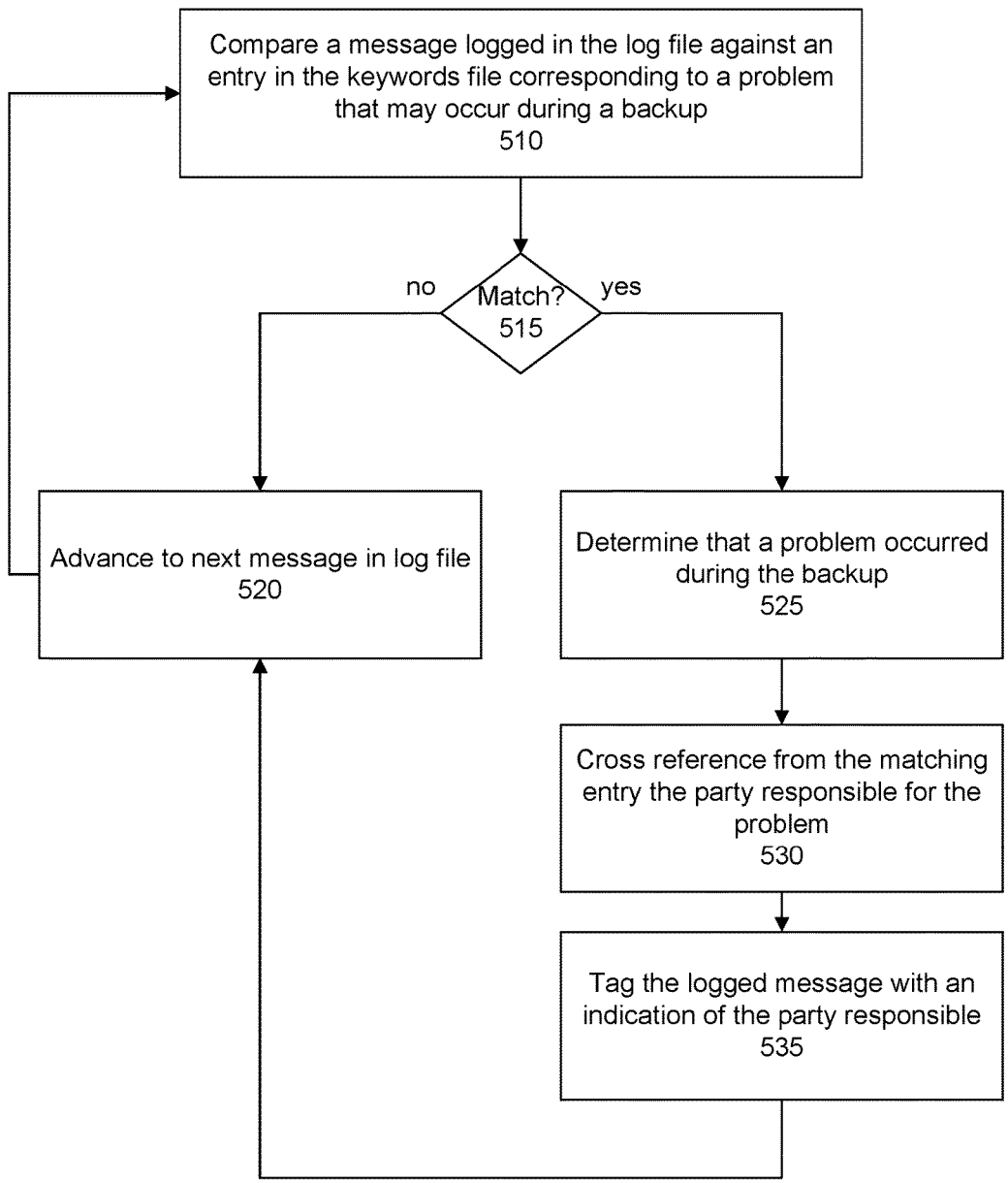
FIG. 5 shows a flow diagram for analyzing messages in a log file against a keywords file according to a specific embodiment.

FIG. 5 shows further detail of a flow for analyzing a log file. In an embodiment, the process may involve a sequential comparison of each message logged in the log file against the entries in the keywords file to find matches. More particularly, in this specific embodiment, in a step 510, a message logged in a log file associated with a backup is compared against entries in a keywords configuration file and corresponding to problems that may potentially occur during the backup.

In a step 515, a determination is made as to whether there is a match between a logged message and an entry. As discussed above, any competent search technique or engine may be used to performing the matching. In a specific embodiment, a regular expression search technique is applied. Such a search function may be available from an operating system of the automated chargeback server. In this specific embodiment, the key parser may issue a call to the operating system library to perform the regular expression search.

In another specific embodiment, an elastic search may be employed. In this specific embodiment, there can be a third-party search engine to which the automated chargeback server will query or assign the search. Using a third-party search engine may be advantageous in cases where there are large number of log files to process and it may thus be desirable to not over-tax the compute resources of the automated chargeback server.

Some examples of search techniques or algorithms that may be applied include pattern or string matching, pattern or string recognition, Naïve string search algorithm, Rabin-Karp string search algorithm, finite-state automaton based search, Knuth-Morris-Pratt algorithm, Boyer-Moore string search algorithm, Bitap algorithm, Two-way string-matching algorithm, Backward Non-Deterministic Dawg Matching, Backward Oracle Matching, Aho-Corasick string matching algorithm, Commentz-Walter algorithm, or fuzzy searches, among others.

In an embodiment, a method may include determining whether a size of the log file exceeds a threshold size, if the size does not exceed the threshold size, selecting a regular expression search for the comparing of the log file against the keywords configuration file, and if the size does exceed the threshold size, selecting an elastic search for the comparing.

In a step 520, if there are no matches between the message and the entries in the keywords configuration file, the system advances to a next message in the log file for comparison and analysis.

Alternatively, if there is a match between the message and an entry in the keywords configuration file, in a step 525, a determination is made that a problem, failure, or error occurred during the backup. In a step 530, the system cross-references from the matching entry the field storing the indication in the keywords configuration file of which party is responsible for the failure. In a step 535, the logged message may be tagged with the indication of the party responsible for the failure. In a specific embodiment, the logged message may be copied from the log file into the results file, separate from the log file, and tagged with an indication of the party responsible. Thus, should the log file be overwritten in the next backup, there will still be a record of the problem in the results file.

Referring back now to FIG. 2, in a distributed network environment, network 210 may represent a cloud-based network environment in which applications, servers and data are maintained and provided through a centralized cloud computing platform. In an embodiment, system 200 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 200 may be stored in any number of persistent storage locations and devices, such as local client storage, server storage, or network storage, which may at least be partially implemented through storage device arrays, such as RAID components. In an embodiment network 210 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

The servers and clients may be general purpose computers including hardware and software components, applications, a processor, memory, storage, network interface, input device, display (e.g., electronic display or screen), and so forth. The system can include any number of servers, clients, and computing nodes.

System 200 may utilize certain protocol-specific namespaces that are the external interface to applications and include NFS (network file system) and CIFS (common internet file system) namespaces, as well as a virtual tape library (VTL) or DD Boost provided by Dell EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files. DD Boost is a high-speed client-side data de-duplication system.

Figure 6:
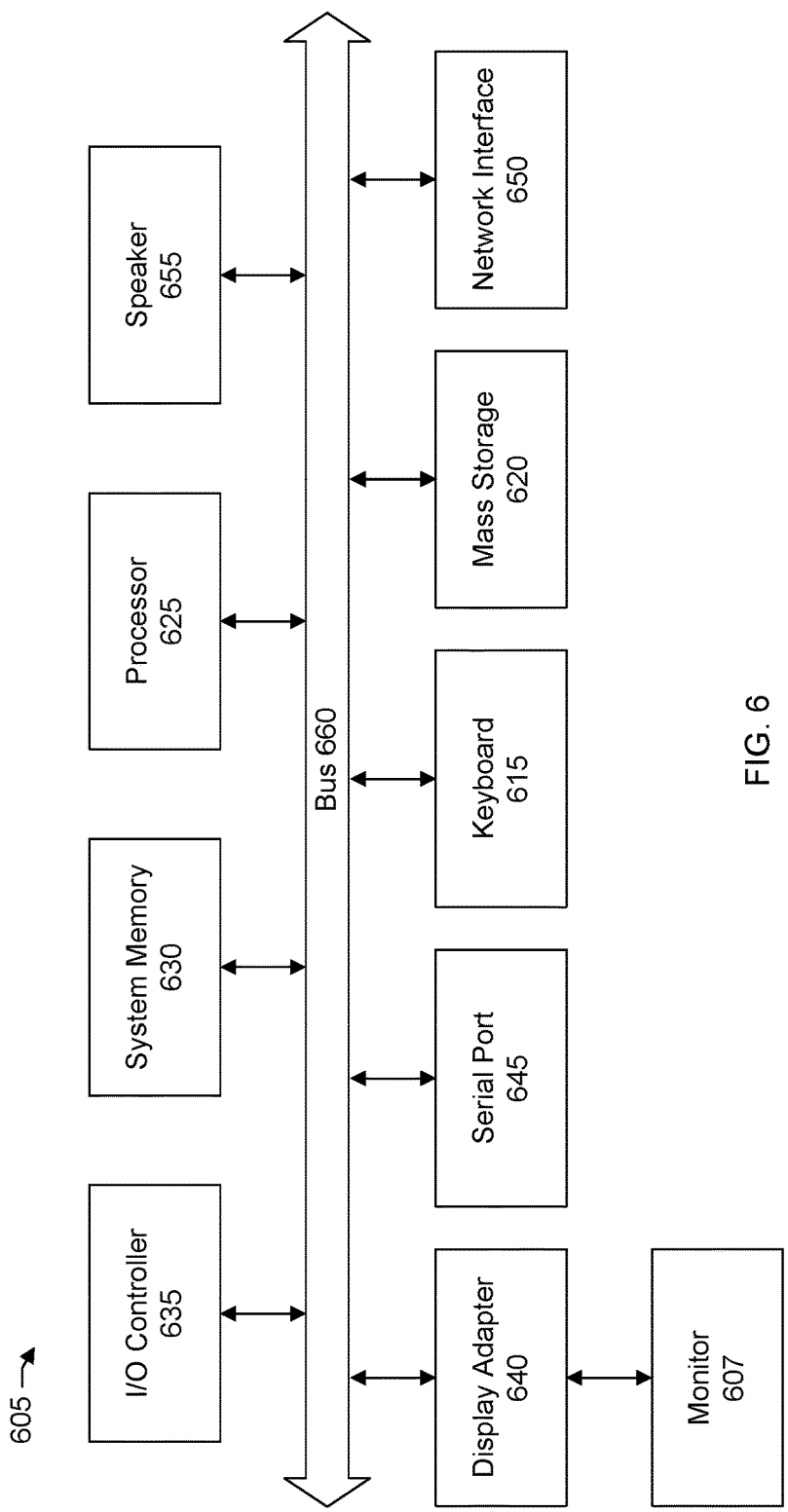
FIG. 6 shows a block diagram of a computer system suitable for use with the system, under some embodiments.

FIG. 6 shows a system block diagram of a computer system 605 used to execute the software of the present system described herein. The computer system includes a monitor 607, keyboard 615, and mass storage devices 620. Computer system 605 further includes subsystems such as central processor 625, system memory 630, input/output (I/O) controller 635, display adapter 640, serial or universal serial bus (USB) port 645, network interface 650, and speaker 655. The system may also be used with computer systems with additional or fewer subsystems. For example, a computer system could include more than one processor 625 (i.e., a multiprocessor system) or a system may include a cache memory.

Arrows such as 660 represent the system bus architecture of computer system 605. However, these arrows are illustrative of any interconnection scheme serving to link the subsystems. For example, speaker 655 could be connected to the other subsystems through a port or have an internal direct connection to central processor 625. The processor may include multiple processors or a multicore processor, which may permit parallel processing of information. Computer system 605 shown in FIG. 6 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In a specific embodiment, a method of categorizing backup failures comprising: storing a keywords file comprising a plurality of entries, each entry comprising at least one of a keyword or string pattern corresponding to a problem that may occur during a backup provided by a backup provider for a customer, and an indication of the problem as being one of chargeable or non-chargeable to the backup provider; reading a log file comprising messages logged during the backup; comparing the messages logged in the log file against the plurality of entries in the keywords file to identify any problems that have occurred during the backup; upon identifying a particular problem that has occurred during the backup, determining, from the keywords file, whether the particular problem is chargeable or non-chargeable to the backup provider; and creating a results file listing the particular problem, and whether the particular problem is chargeable or non-chargeable to the backup provider.

The method may include storing one of a first or second configuration setting, wherein the first configuration setting specifies categorizing backup failures after all backup jobs of a plurality of backup jobs of a backup window end, and the second configuration setting specifies categorizing immediately after each backup job ends.

The method may include determining whether a size of the log file exceeds a threshold size; if the size does not exceed the threshold size, selecting a regular expression search for the comparing; and if the size does exceed the threshold size, selecting an elastic search for the comparing.

In an embodiment, the backup is a first backup of a first backup client, the log file is a first log file associated with the first backup, and the method comprises: allowing the first backup to complete; allowing a second backup of a second backup client to complete; storing a log configuration file specifying a first directory location of the first log file, and a second directory location of a second log file associated with the second backup; and after each of the first and second backups have completed, obtaining the first and second log files from the log configuration file to compare against the keywords file. In an embodiment, the storing the keywords file occurs before the backup begins.

In another specific embodiment, there is a system for categorizing backup failures, the system comprising: a processor-based system executed on a computer system comprising a processor, wherein the processor is configured to: store a keywords file comprising a plurality of entries, each entry comprising at least one of a keyword or string pattern corresponding to a problem that may occur during a backup provided by a backup provider for a customer, and an indication of the problem as being one of chargeable or non-chargeable to the backup provider; read a log file comprising messages logged during the backup; compare the messages logged in the log file against the plurality of entries in the keywords file to identify any problems that have occurred during the backup; upon identifying a particular problem that has occurred during the backup, determine, from the keywords file, whether the particular problem is chargeable or non-chargeable to the backup provider; and create a results file listing the particular problem, and whether the particular problem is chargeable or non-chargeable to the backup provider.

In another specific embodiment, there is a computer program product, comprising a non-transitory computer-readable medium having a computer-readable program code embodied therein, the computer-readable program code adapted to be executed by one or more processors to implement a method comprising: storing a keywords file comprising a plurality of entries, each entry comprising at least one of a keyword or string pattern corresponding to a problem that may occur during a backup provided by a backup provider for a customer, and an indication of the problem as being one of chargeable or non-chargeable to the backup provider; reading a log file comprising messages logged during the backup; comparing the messages logged in the log file against the plurality of entries in the keywords file to identify any problems that have occurred during the backup; upon identifying a particular problem that has occurred during the backup, determining, from the keywords file, whether the particular problem is chargeable or non-chargeable to the backup provider; and creating a results file listing the particular problem, and whether the particular problem is chargeable or non-chargeable to the backup provider.

In a specific embodiment, aspects and principles of the system are applied to categorizing failures in a backup product or service by identifying the party responsible for the failure. It should be appreciated, however, that the system can be applied to categorizing failures in any type of product or service.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method of categorizing backup failures comprising:
storing a keywords file comprising a plurality of entries, each entry comprising at least one of a keyword or string pattern corresponding to a problem that occurs during a backup provided by a backup provider for a customer, and an indication of the problem as being one of chargeable or non-chargeable to the backup provider;
reading a log file comprising messages logged during the backup;
comparing the messages logged in the log file against the plurality of entries in the keywords file to identify any problems that have occurred during the backup;
upon identifying a particular problem that has occurred during the backup, determining, from the keywords file, whether the particular problem is chargeable or non-chargeable to the backup provider; and
creating a results file listing the particular problem, and whether the particular problem is chargeable or non-chargeable to the backup provider.

2. The method of claim 1 comprising:
storing one of a first or second configuration setting, wherein the first configuration setting specifies categorizing backup failures after all backup jobs of a plurality of backup jobs of a backup window end, and the second configuration setting specifies categorizing immediately after each backup job ends.

3. The method of claim 1 comprising:
determining whether a size of the log file exceeds a threshold size;
if the size does not exceed the threshold size, selecting a regular expression search for the comparing; and
if the size does exceed the threshold size, selecting an elastic search for the comparing.

4. The method of claim 1 wherein the backup is a first backup of a first backup client, the log file is a first log file associated with the first backup, and the method comprises:
allowing the first backup to complete;
allowing a second backup of a second backup client to complete;
storing a log configuration file specifying a first directory location of the first log file, and a second directory location of a second log file associated with the second backup; and
after each of the first and second backups have completed, obtaining the first and second log files from the log configuration file to compare against the keywords file.

5. The method of claim 1 wherein the storing the keywords file occurs before the backup begins.

6. A system for categorizing backup failures, the system comprising:
a processor-based system executed on a computer system comprising a processor, wherein the processor is configured to:
store a keywords file comprising a plurality of entries, each entry comprising at least one of a keyword or string pattern corresponding to a problem that occurs during a backup provided by a backup provider for a customer, and an indication of the problem as being one of chargeable or non-chargeable to the backup provider;
read a log file comprising messages logged during the backup;
compare the messages logged in the log file against the plurality of entries in the keywords file to identify any problems that have occurred during the backup;
upon identifying a particular problem that has occurred during the backup, determine, from the keywords file, whether the particular problem is chargeable or non-chargeable to the backup provider; and
create a results file listing the particular problem, and whether the particular problem is chargeable or non-chargeable to the backup provider.

7. The system of claim 6 wherein the processor is configured to:
store one of a first or second configuration setting, wherein the first configuration setting specifies categorizing backup failures after all backup jobs of a plurality of backup jobs of a backup window end, and the second configuration setting specifies categorizing immediately after each backup job ends.

8. The system of claim 6 wherein the processor is configured to:
determine whether a size of the log file exceeds a threshold size;
if the size does not exceed the threshold size, select a regular expression search for the comparing; and
if the size does exceed the threshold size, select an elastic search for the comparing.

9. The system of claim 6 wherein the backup is a first backup of a first backup client, the log file is a first log file associated with the first backup, and the processor is configured to:
allow the first backup to complete;
allow a second backup of a second backup client to complete;
store a log configuration file specifying a first directory location of the first log file, and a second directory location of a second log file associated with the second backup; and
after each of the first and second backups have completed, obtain the first and second log files from the log configuration file to compare against the keywords file.

10. The system of claim 6 wherein the keywords file is stored before the backup begins.

11. A computer program product, comprising a non-transitory computer-readable medium having a computer-readable program code embodied therein, the computer-readable program code adapted to be executed by one or more processors to implement a method comprising:
storing a keywords file comprising a plurality of entries, each entry comprising at least one of a keyword or string pattern corresponding to a problem that occurs during a backup provided by a backup provider for a customer, and an indication of the problem as being one of chargeable or non-chargeable to the backup provider;
reading a log file comprising messages logged during the backup;
comparing the messages logged in the log file against the plurality of entries in the keywords file to identify any problems that have occurred during the backup;

upon identifying a particular problem that has occurred during the backup, determining, from the keywords file, whether the particular problem is chargeable or non-chargeable to the backup provider; and creating a results file listing the particular problem, and whether the particular problem is chargeable or non-chargeable to the backup provider.

12. The computer program product of claim 11 wherein the method comprises:

storing one of a first or second configuration setting, wherein the first configuration setting specifies categorizing backup failures after all backup jobs of a plurality of backup jobs of a backup window end, and the second configuration setting specifies categorizing immediately after each backup job ends.

13. The computer program product of claim 11 wherein the method comprises:

determining whether a size of the log file exceeds a threshold size;

if the size does not exceed the threshold size, selecting a regular expression search for the comparing; and if the size does exceed the threshold size, selecting an elastic search for the comparing.

14. The computer program product of claim 11 wherein the backup is a first backup of a first backup client, the log file is a first log file associated with the first backup, and the method comprises:

allowing the first backup to complete;

allowing a second backup of a second backup client to complete;

storing a log configuration file specifying a first directory location of the first log file, and a second directory location of a second log file associated with the second backup; and after each of the first and second backups have completed, obtaining the first and second log files from the log configuration file to compare against the keywords file.

15. The computer program product of claim 11 wherein the storing the keywords file occurs before the backup begins.

* * * * *